United States Patent
Smith, III

(10) Patent No.: US 6,976,695 B1
(45) Date of Patent: Dec. 20, 2005

(54) TRAILER HITCH COUPLER LOCK ASSEMBLY

(75) Inventor: Samuel D. Smith, III, Piedmont, OK (US)

(73) Assignee: SDS Enterprises, L.L.C., Piedmont, OK (US)

( * ) Notice: Subject to any disclaimer, the term of this patent is extended or adjusted under 35 U.S.C. 154(b) by 41 days.

(21) Appl. No.: 10/238,369

(22) Filed: Sep. 9, 2002

Related U.S. Application Data

(60) Provisional application No. 60/318,428, filed on Sep. 10, 2001, provisional application No. 60/336,431, filed on Nov. 1, 2001.

(51) Int. Cl.$^7$ .............................................. B60D 1/28
(52) U.S. Cl. ........................................ 280/507; 70/18
(58) Field of Search ................................ 280/507, 512, 280/491.5; 70/18, 58, 258; 403/143; 74/527

(56) References Cited

U.S. PATENT DOCUMENTS

| | | | |
|---|---|---|---|
| 1,359,213 A * | 11/1920 | Welch ........................ 70/183 |
| 2,204,882 A | 6/1940 | Berluti |
| 2,641,124 A | 6/1953 | Gallagher et al. |
| 2,656,706 A | 10/1953 | Lucas et al. |
| 2,891,806 A | 6/1959 | Haverly et al. |
| 3,269,159 A | 8/1966 | Young |
| 3,374,268 A | 3/1968 | Groves |
| 3,391,555 A | 7/1968 | Mamo |
| 3,605,457 A | 9/1971 | Foster |
| 3,759,549 A | 9/1973 | Morris |
| 3,820,823 A * | 6/1974 | Beaston ........................ 280/512 |
| 4,133,553 A * | 1/1979 | Pierce ........................ 280/509 |
| 4,141,569 A * | 2/1979 | Dilk ........................ 280/507 |
| 4,157,190 A * | 6/1979 | Nyman ........................ 280/512 |
| 4,186,940 A | 2/1980 | Pillars |
| 4,711,106 A | 12/1987 | Johnson |
| 4,730,841 A * | 3/1988 | Ponder ........................ 280/501 |
| 4,778,196 A * | 10/1988 | Spoliansky ................ 280/512 |
| 4,925,205 A | 5/1990 | Villalon et al. |
| 5,018,759 A * | 5/1991 | Villalon et al. ............. 280/507 |
| 5,284,038 A | 2/1994 | Johnson |
| 5,410,893 A | 5/1995 | Easterwood |
| 5,433,468 A * | 7/1995 | Dixon ........................ 280/507 |
| 5,441,295 A * | 8/1995 | Smith ........................ 280/507 |
| 5,540,065 A | 7/1996 | Wyers |
| 5,544,505 A | 8/1996 | McIntosh et al. |
| 5,582,420 A * | 12/1996 | Ulbrich ........................ 280/507 |
| 5,584,495 A | 12/1996 | Mason |
| 5,681,053 A | 10/1997 | Misukanis et al. |
| 5,700,024 A * | 12/1997 | Upchurch ........................ 280/507 |

(Continued)

*Primary Examiner*—Paul N. Dickson
*Assistant Examiner*—Daniel Yeagley
(74) *Attorney, Agent, or Firm*—Fellers, Snider, et al.; Bill D. McCarthy

(57) ABSTRACT

The present invention provides a trailer coupler lock assembly for securing a coupler whether attached to or detached from a hitch ball of a trailer or vehicle, the coupler attachable to the hitch ball supported by one of the trailer or vehicle, the locking assembly having a first bracket member and a second bracket member, each of the first and second bracket members having a locking tab with a locking bore. A hinge connects the first and second bracket members, the first and second bracket members having an open position and a closed position, the first and second bracket members configured to form a body receiving cavity disposable about the coupler and lock thereto when the first and second bracket members are in the closed position, the locking bores being disposed in axial alignment to receive the shackle of a padlock there through.

7 Claims, 5 Drawing Sheets

U.S. PATENT DOCUMENTS

| | | |
|---|---|---|
| 5,775,139 A | 7/1998 | Sellers |
| 5,873,271 A | 2/1999 | Smith |
| 5,937,679 A | 8/1999 | Villalon, Jr. |
| 5,947,506 A | 9/1999 | Bauer |
| 5,956,980 A | 9/1999 | Jenkins, Jr. |
| 5,987,938 A | 11/1999 | Frei |
| 6,062,583 A * | 5/2000 | Lauricella, Jr. ............. 280/507 |
| 6,070,441 A | 6/2000 | Bernstrom |
| 6,155,589 A | 12/2000 | Simpson |
| 6,202,453 B1 | 3/2001 | Disher et al. |
| 6,244,080 B1 | 6/2001 | Sakurai |

* cited by examiner

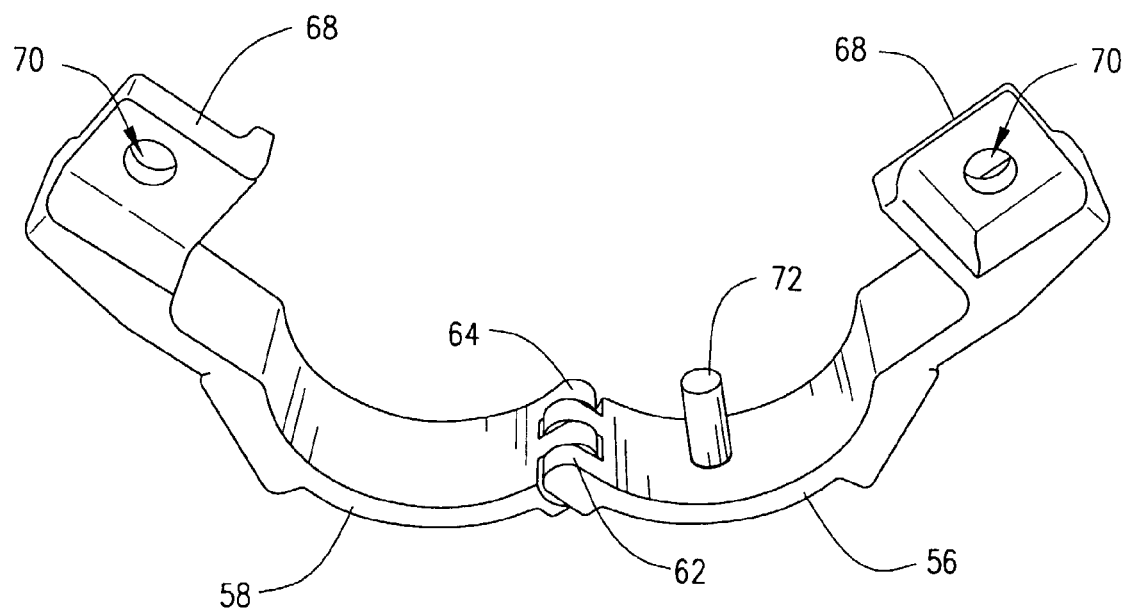
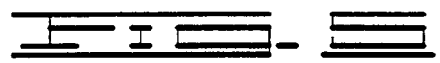
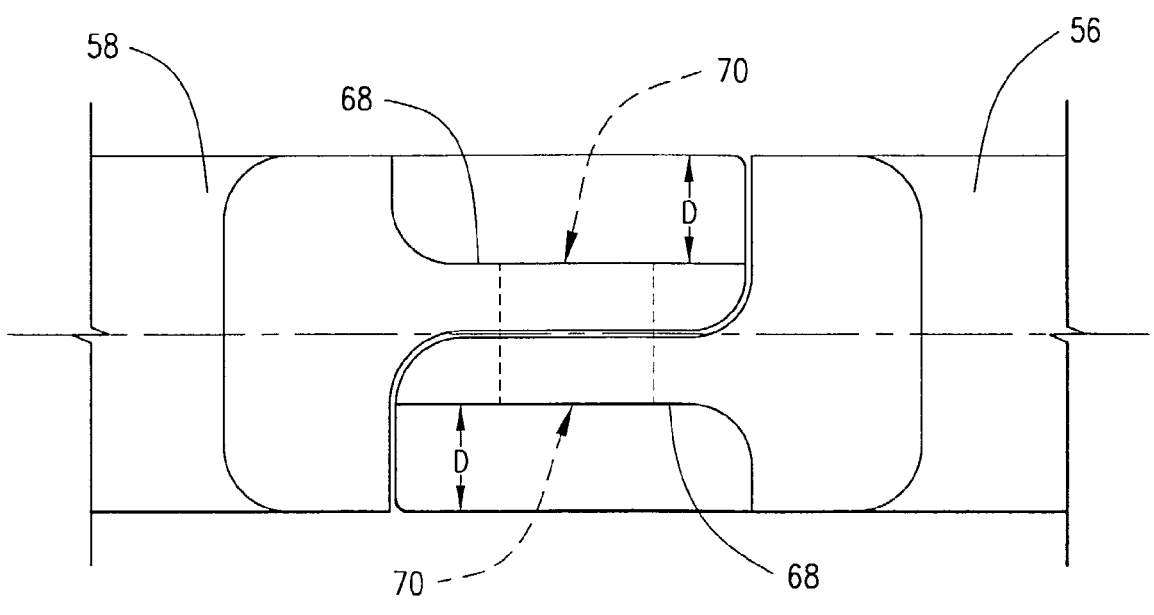
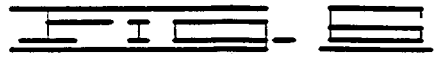

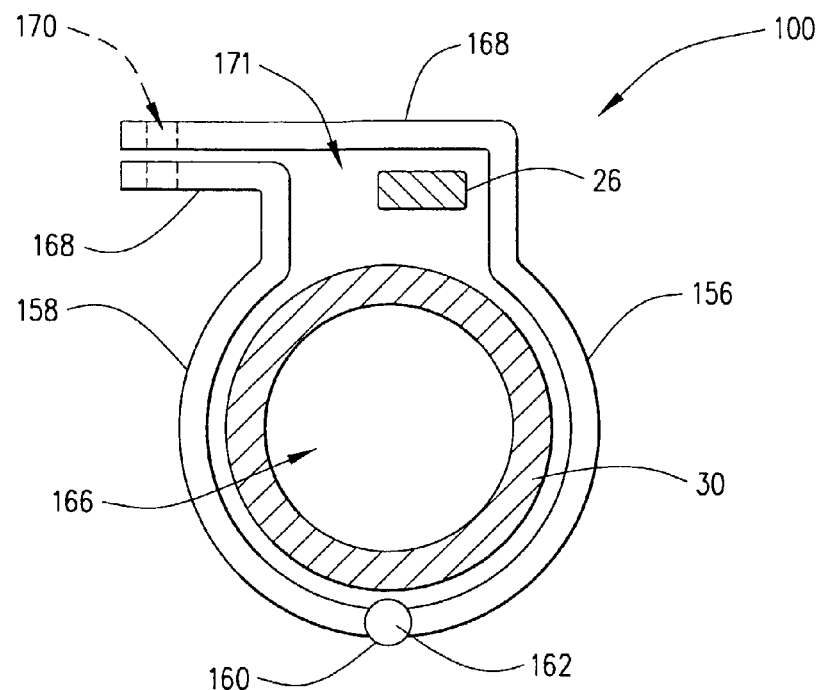
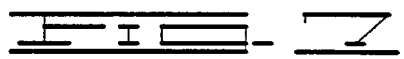
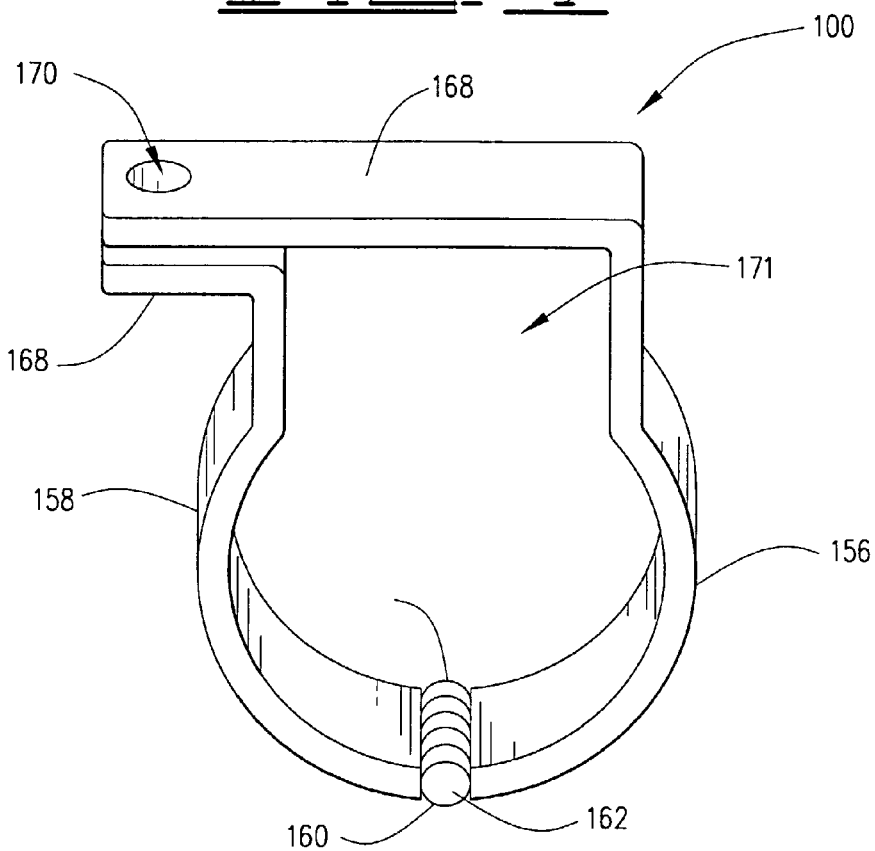
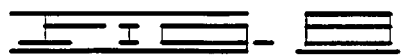

TRAILER HITCH COUPLER LOCK ASSEMBLY

RELATED APPLICATION

The present application claims priority to U.S. Provisional Application 60/318,428 filed Sep. 10, 2001, and to U.S. Provisional Application 60/336,431 filed Nov. 1, 2001.

BACKGROUND OF THE INVENTION

1. Field of Invention

The present invention relates to the field of transport vehicles, and more particularly but not by way of limitation, to an improved lock assembly for securing a trailer coupler.

2. Discussion

A common means of expanding the hauling capacity of land based vehicles is by the use of a wide variety of trailers, including utility or flatbed trailers, box trailers, livestock trailers and travel trailers. While there are several means for coupling a trailer to a vehicle, two of the most common are the fifth-wheel hitch and the rear-mounted hitch ball hitch assembly, the latter being perhaps the most popular. While the hitch ball portion of a hitch ball hitch assembly can vary in size and mounting location, the vehicle portion of most hitch ball hitching assemblies is generally constant. However, the trailer coupler that connects to the vehicle hitch ball varies greatly in design.

Due to variation in trailer couplers there have been numerous prior art devices designed for securing hitch ball hitch assemblies to prevent theft and accidental detachment of the trailer from the vehicle. Such security devices are generally of two broad types, box or canister devices that cover all or a portion of the coupler assembly and those that function to prevent a hitch ball from entering the coupler by restricting access to the operating mechanism. Examples of the first type are taught by U.S. Pat. No. 6,244,080 issued to Ray, et al.; U.S. Pat. No. 6,202,453 issued to Disher, et al.; U.S. Pat. No. 6,070,441 issued to Bernstrom; U.S. Pat. No. 5,937,679 issued to Villalon, Jr.; U.S. Pat. No. 5,794,961 issued to Niswanger; and U.S. Pat. No. 5,775,139 issued to Sellers. Patents that teach security devices that prevent hitch ball insertion into a trailer coupler include U.S. Pat. No. 5,410,893 issued to Easterwood; and U.S. Pat. No. 4,186,940 issued to Pillars.

A problem associated with these devices is that they can only be used when the trailer is detached from the vehicle. Thus, for protection against theft when the trailer is attached to a vehicle, another security device must be used. Additionally, when the trailer is attached to a vehicle, these devices must be stored, risking being lost or stolen.

Devices that lock a trailer to a towing vehicle comprise another category of security devices. Methods of functioning vary and include plate or chain devices permanently attached to either the vehicle or trailer. Examples of these latter mentioned devices are taught by U.S. Pat. No. 6,155,589 issued to Simpson; U.S. Pat. No. 6,062,583 issued to Lauricella, Jr.; U.S. Pat. No. 5,956,980 issued to Jenkins; U.S. Pat. No. 5,947,506 issued to Bauer; U.S. Pat. No. 5,873,271 issued to Smith; and U.S. Pat. No. 5,700,024 issued to Upchurch.

Depending upon the design, such security devices often require extensive and usually professional installation to either the vehicle or the trailer. Another problem associated with many of these devices, especially to vehicle mounted devices, is that they do not provide theft protection for the trailer when the trailer is not attached to a vehicle.

Yet another category of prior art security devices comprise those that simply lock the pre-existing latching mechanism of the hitch. Examples of such security devices are taught by U.S. Pat. No. 5,540,065 issued to Wyers; U.S. Pat. No. 5,284,038 issued to Johnson; and U.S. Pat. No. 4,711,106 issued to Johnson. The major problem associated with these security devices is that they cannot be used to lock certain types of sliding collar, or sleeve, hitches due to there being no provision for locking. As appearing herein, the words collar and sleeve will be interchangeable as such appears to the custom in the industry.

Some sliding collar trailer hitches do have a bore through the hitch neck for the insertion of a safety pin, but the placement of the accompanying lock makes these devices susceptible to accidental or intentional damage. Further, since the diameter of the bore that is usually provided is relatively small (usually one quarter inch or less), the pin on the lock has to be small and thus is easily sheared by one intent on defeating the security.

One additional prior art device is taught by U.S. Pat. No. 3,820,823, issued to Beaston for a sliding collar trailer hitch. The device is disposed in a slot and held in place horizontally by a padlock on one side and a flange on the other side, and it operates to block movement of the collar. A particular problem with the arrangement of this structure is that severance of the operating rod frees the device.

Finally, U.S. Pat. No. 5,582,420, issued to Ulbrich, teaches a method for retrofitting hitches of the type taught by U.S. Pat. No. 4,133,553, issued to Pierce, to accept a padlock. While this design does provide a locking method, the device is vulnerable to tampering or damage to the operating rod, the lever or the interface between the two to release the sliding collar. Additionally, modification of the hitch is required for its installation.

SUMMARY OF THE INVENTION

The present invention provides a trailer hitch coupler lock assembly for securing a trailer coupler, whether attached to, or detached from, a vehicle, the coupler attachable to a hitch ball supported by one of the trailer or vehicle, the locking assembly having a first bracket member having and a second bracket member, the first bracket member having a locking tab with a first locking bore. The second bracket member has a locking tab with a second locking bore. A hinge connects the first and second bracket members, the first and second bracket members having an open position and a closed position, the first and second bracket members configured to form a body receiving cavity disposable about the coupler and locked thereto when the first and second bracket members are in the closed position, the first locking bore and the second locking bore being disposed in axial alignment to receive the shackle of a padlock there through.

The advantages and features of the present invention will be apparent from the following description when read in conjunction with the accompanying drawings and appended claims.

BRIEF DESCRIPTION OF THE DRAWINGS

FIG. 4 is front elevation view of the trailer hitch coupler lock assembly of FIG. 3 along line 4—4 having the padlock removed there from.

FIG. 5 is a view in perspective of the trailer hitch coupler lock assembly of FIG. 4 in its open position.

FIG. 6 is a fragmentary end view of the trailer hitch coupler lock assembly of FIG. 4.

FIG. 7 is a front elevation of another trailer hitch coupler lock assembly constructed in accordance with the present invention and mounted on a trailer coupler.

FIG. 8 is a perspective of the trailer hitch coupler lock assembly of FIG. 7 shown in its open closed position.

FIG. 9 is a perspective view of the trailer hitch coupler lock assembly of FIG. 7 shown in its open position.

DESCRIPTION

Figure 1:
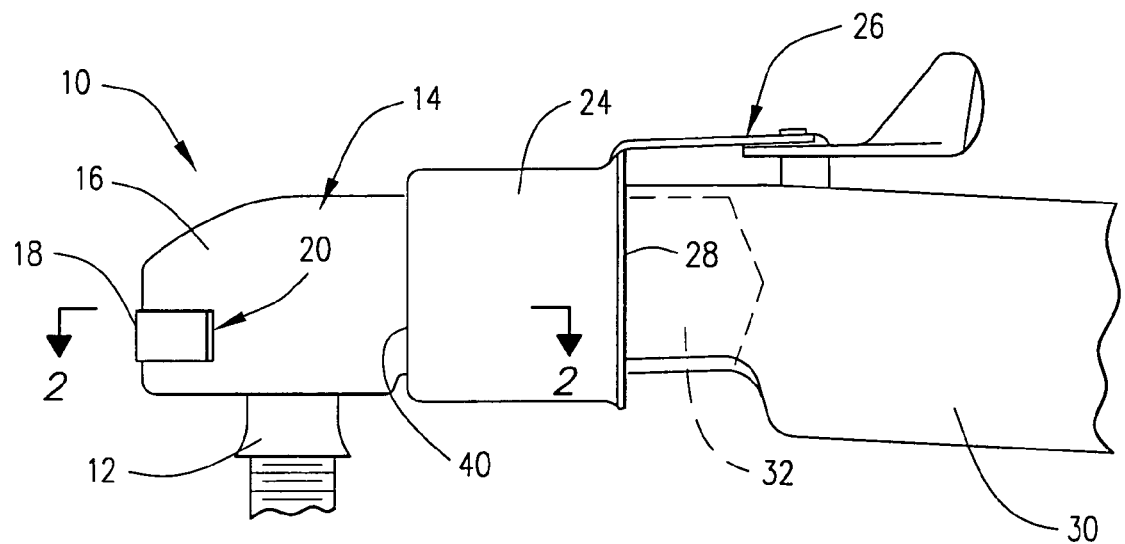
FIG. 1 is a side elevation view of a conventional trailer coupler for which the present invention is suited to secure.

Referring particularly to FIG. 1, shown therein is a typical coupler 10 that is connectable to a conventional hitch ball 12. The coupler 10, as shown, is that taught by U.S. Pat. No. 4,133,553, and while the present invention finds particularly use with the coupler depicted, it will be understood that the present invention is not so limited. For complete understanding of the coupler taught in U.S. Pat. No. 4,133,553, that patent is incorporated herein by reference for such details of the coupler beyond the brief description provided herein.

As used herein, the term "coupler" is used for that portion of a hitch which attaches to a connecting member, such as a hitch ball member, and the coupler with the connecting member serve to interconnect a pulling vehicle and a following trailer or the like. The connecting member is usually mounted to the rear of the pulling vehicle with the coupler mounted to the following trailer, but the coupler can be mounted to the front of the trailer, and the coupler mounted to the rear of the vehicle. It will also be understood that when trailers are pulled in tandem, the leading trailer will have one of the connecting member and coupler, and the pulled trailer will have the other of the connecting member and the coupler.

Figure 2:
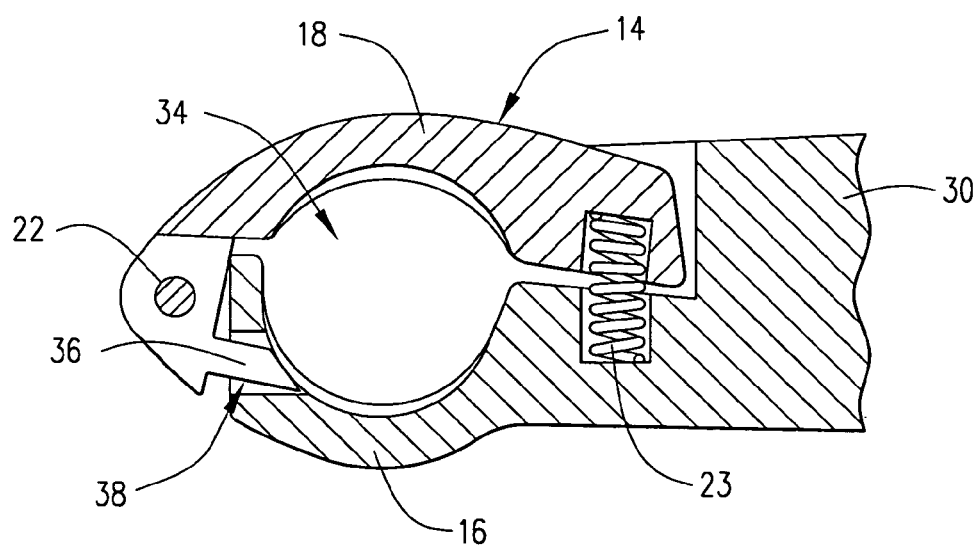
FIG. 2 is a fragmentary cross-sectional view of the trailer coupler of FIG. 1 along line 2—2 with the hitch ball removed.

With further reference to FIG. 1, and also to FIG. 2, the coupler 10 is formed from a body 14 and a cap 16. The cap 16 has a pivoting front portion 18 which is hinged in a recessed portion 20 of the body 14 at a hinge 22, and the pivoting front portion 18 is biased outwardly, or open, by a compression spring 23. A collar 24 latches the body 14 and cap 16 in a closed position. A handle 26 engages a rear flange 28 of the collar 24, the handle 26 being pivotally mounted on a tongue 30 behind a rear portion 32 of the body 14. Some couplers are not equipped with a handle, such as the handle 26, and the collar is simply hand manipulated.

The pivoting front portion 18 of the cap 16 fits in a recess 34 of the body 14. A pin 36 extends laterally to the pivoting front portion 18. The pin 36 fits in the aperture 38 extending to the interior recess 34 of body 14.

The collar 24 is slideably mounted on the rear portion 32 of the body 14 and is biased to a closed position by a spring (not shown) internal to the collar 24 and that is coiled about the tongue 30. This internal spring (not shown) has its back portion abutting a retaining ring (also not shown) attached to the tongue 30 and its front portion engaged with a rolled forward end 40 of the collar 24.

In operation, the pin 36 extends into the interior recess 34 of the body 14 when the cap 16 is open. The hitch ball 12, when inserted into the recess 34, will be self-centered by its top surface; as the hitch ball 12 enters the interior recess 34, the hitch ball 12 presses against the pin 36 and displaces it from the interior recess 34. As the pin 36 is pushed out of the interior recess 34 the pivoting front portion 18 pivots around the hinge 22 and closes with respect to the body 14. As the hitch ball 12 attains a self-centered position in the hollow hitch ball cavity, the protrusion pushes the cap 16 to a position wherein the collar 24 extends over the cap 16 and rear section 32 of the body 14. The collar 24 automatically slides forward under pressure from its spring to move the cap 16 to its closed position. That is, the cap 16 is closed by the pressure exerted by the collar 24, the pin 36 thereby being slightly recessed from the surface of the recess 34. When the collar 24 is closed around the cap 16, the hitch ball 12 is correctly seated in the interior recess 34 and the cap 16 clamps over the hitch ball 12.

The tongue 30 pivotally supports the handle 26, and when pivoted, the handle 26 will pull the collar 24 away from the cap 16. That is, pivoting the handle 26 will move the collar 24 backward, releasing the cap 16 to assume an open position; the hitch ball 12 can then be disengaged from the coupler 10. The spring 23 automatically opens the cap 18 when the collar 24 is removed rearward so that the hitch ball 12 can be removed from interior recess, or cavity, 34. The cap 16 is incapable of being opened when the collar 24 slides forward over the cap 16.

Figure 3:
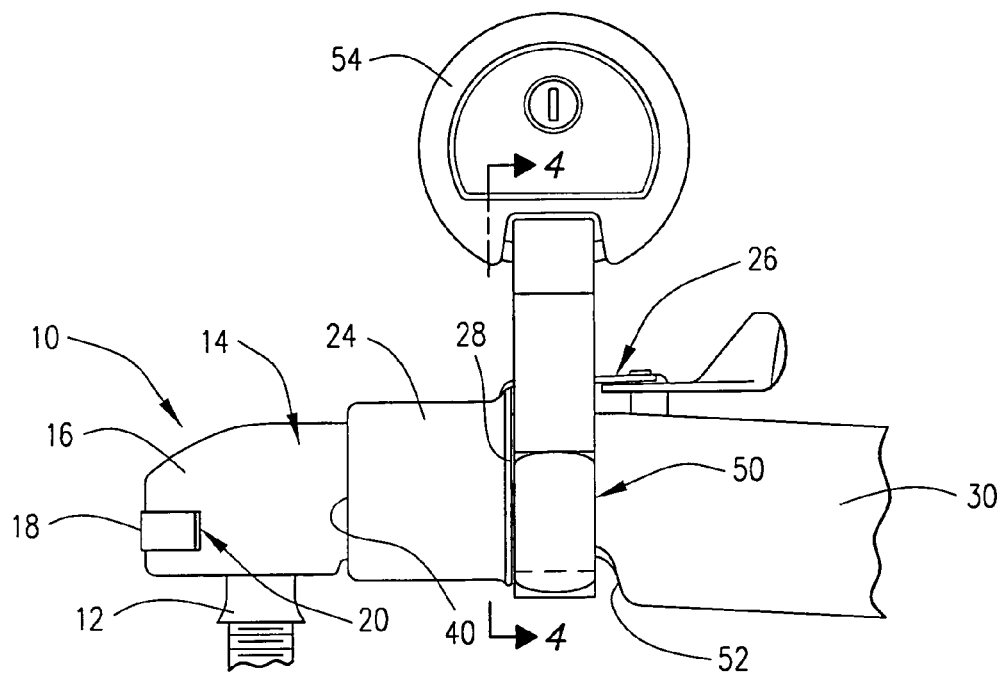
FIG. 3 is another side elevation view of the trailer coupler of FIG. 1 having disposed thereon a trailer hitch coupler lock assembly constructed in accordance with the present invention.
Figure 4:
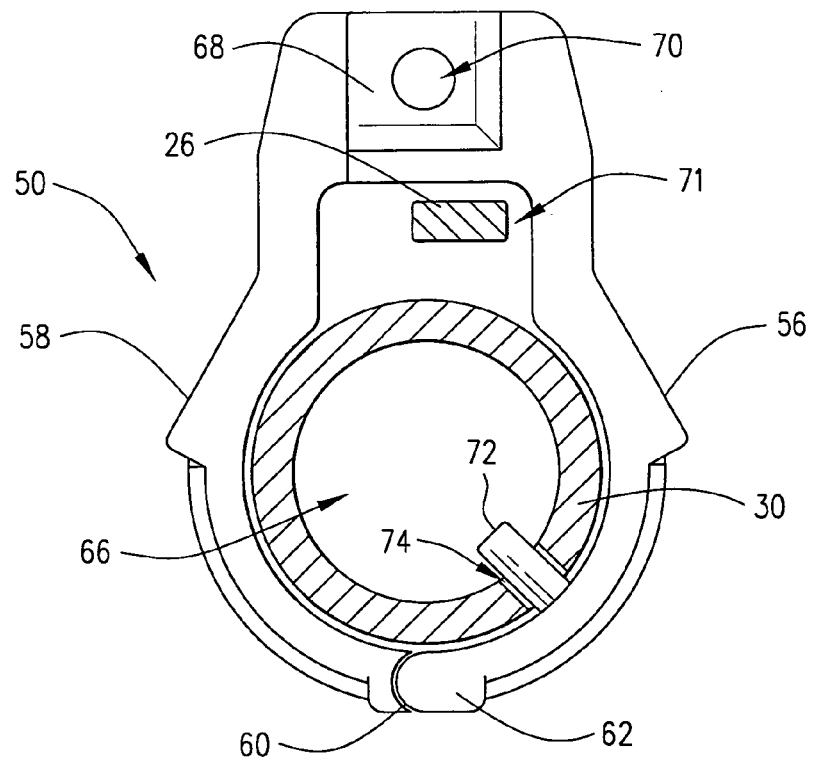
Figure 3:
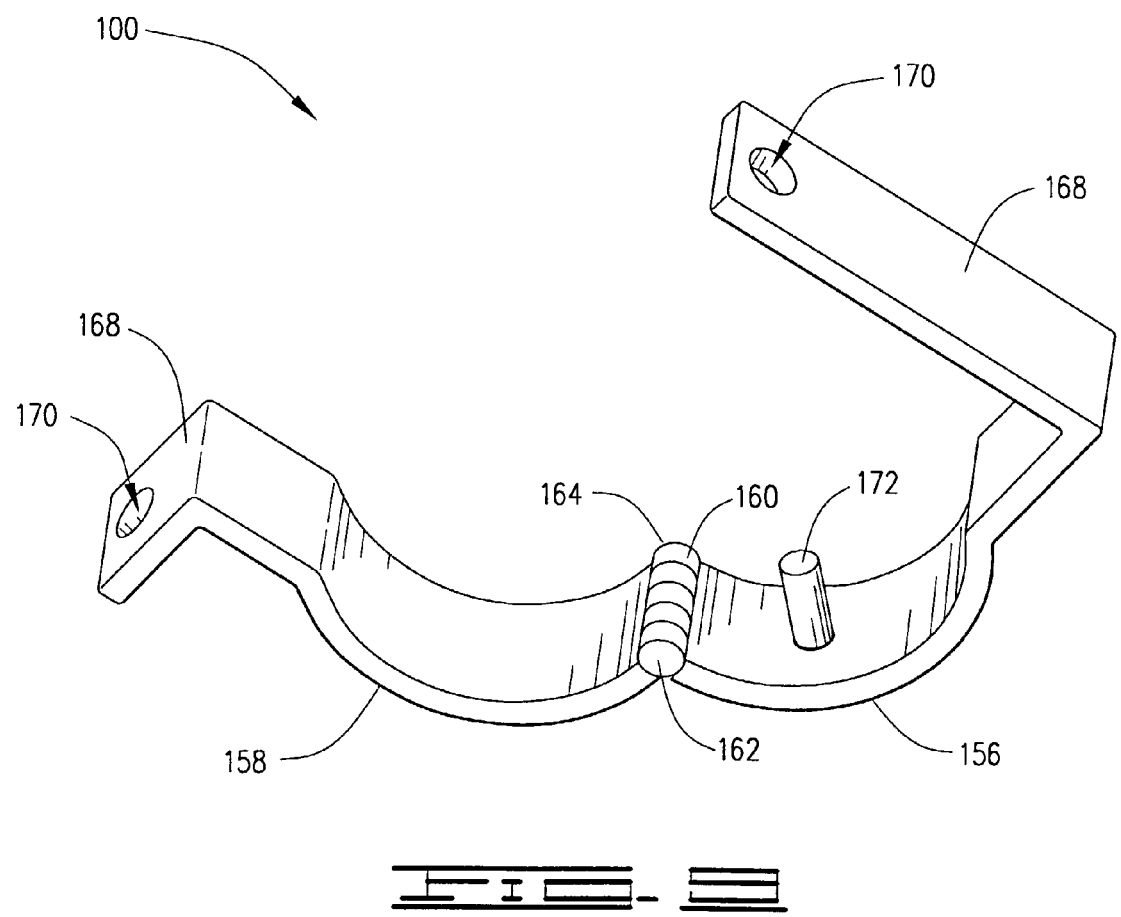

FIGS. 3 and 4 show a trailer hitch coupler lock assembly 50 constructed in accordance with the present invention and mounted on the coupler 10. It will be noted that the tongue 30 of the coupler 10 has a shoulder 52 that is formed between that of the rear portion and the forward portion of the tongue 30, the forward portion having a reduced diameter. The trailer hitch coupler lock assembly 50 is configured to mount over the forward portion of the tongue 30 between the collar 24 and the shoulder 52. A padlock 54 secures the trailer hitch coupler lock assembly 50 as shown.

The trailer hitch coupler lock assembly 50 has a first bracket member 56 and a second bracket member 58 that are connected by a hinge 60. The hinge 60 has a pin (not shown) that extends through axially aligned holes in the mating lower end portions 62, 64 of the first and second bracket members 56, 58, respectively, as shown in FIG. 5.

The first and second bracket members 56, 58 are configured to form a cylindrically shaped, body cavity 66 that is dimensioned to receive the forward end portion of the tongue 30 of the coupler 10 therein. Each of the first and second bracket members 56, 58 has a locking tab 68 at its upper end, each locking tab 68 having a locking bore 70 there through. Each locking tab 68 is offset on its supporting bracket member so that the locking tabs 68 will be positioned in overlapping spatial relationship as shown in FIG. 6, when the first and second bracket members 56, 58 are closed, and whereby the locking bores 70 are axially aligned.

The locking tabs 68 are inset from the outer surfaces of the first and second bracket members 56, 58 by a predetermined inset distance "D" as depicted in FIG. 6. The purpose of the inset "D" is to provide increased strength to the locking tabs 68 and to protect the shackle of the padlock 54. While a conventional padlock 54 is depicted in FIG. 3, it is recommended that a padlock be selected having a minimal shackle length to pass through the aligned locking bores 70, lock and leave little or no shackle exposure. This will minimize the likelihood of a security breach from the shackle being severed.

As shown in FIG. 4, the first and second brackets 56, 58 form a handle notch 71 when in the closed position, and the dimensions of the handle notch 71 are determined to provide clearance over the handle 26 when the trailer hitch coupler lock assembly 50 is mounted to the coupler 10. Further, the dimensions of the trailer hitch coupler lock assembly 50 are determined so that it is positioned to reside between the rear flange 28 of the collar 24 and the shoulder 52 of the tongue 30.

The positioning of the mounted trailer hitch coupler lock assembly 50 prevents the rearward movement of the collar 24, thereby locking the cap 16. If the cap 16 is secured to the ball 12, as when a trailer is attached to a pulling vehicle, the presence of the trailer hitch coupler lock assembly 50 will prevent disengagement of the coupler 10 from the ball 12. If the cap 16 is not secured to the ball 12, as when a trailer is not attached to its pulling vehicle, the presence of the trailer hitch coupler lock assembly will prevent engagement with the ball 12, effectively insuring that the trailer can be used only by the owner.

An optional feature is the provision of a locking rod 72 extending from the internal surface of the first bracket member 56. In this embodiment, a retaining bore 74 is placed in the tongue 30 as shown in FIG. 4 in a location to receive the insertion of the locking rod 72. The locking rod 72 and retaining bore 74 may be provided in those applications in which the prevention of rotation of the mounted trailer hitch coupler lock assembly on the tongue 30 is desired, such as when no handle 26 is provided with the coupler.

FIGS. 7 Through 9

FIG. 7 shows a trailer hitch coupler lock assembly 100 constructed in accordance with the present invention and mounted on tongue 30 of the coupler 10. The trailer hitch coupler lock assembly 100 is configured to mount over the forward portion of the tongue 30 between the collar 24 and the shoulder 52. Although not shown in FIG. 7, it will be understood that the padlock 54 can be used therewith to secure the trailer hitch coupler lock assembly 100 in the manner described above for the trailer hitch coupler lock assembly 50.

The trailer hitch coupler lock assembly 100 has a first bracket member 156 and a second bracket member 158 that are connected by a hinge 160. The hinge 160 has a pin (not shown) that extends through axially aligned holes in the mating lower end portions 162, 164 of the first and second bracket members 156, 158, respectively, as shown in FIG. 8.

The first and second bracket members 156, 158 are configured to form a cylindrically shaped, body cavity 166 that is dimensioned to receive the forward end portion of the tongue 30 of the trailer coupler 10 therein. Each of the first and second bracket members 156, 158 has a locking tab 168 at its upper end, each locking tab 168 having a locking bore 170 there through. Each locking tab 168 is offset on its supporting bracket member so that the locking tabs 168 will be positioned in overlapping spatial relationship as shown in FIG. 7, when the first and second bracket members 156, 158 are closed, and whereby the locking bores 170 are axially aligned.

The first and second brackets 156, 158 form a handle notch 171 when in the closed position, and the dimensions of the handle notch 171 are determined to provide clearance over the handle 26 when the trailer hitch coupler lock assembly 100 is mounted to the trailer coupler 10. Further, the dimensions of the trailer hitch coupler lock assembly 100 are determined so that it is positioned to reside between the rear flange 28 of the collar 24 and the shoulder 52 of the tongue 30.

The positioning of the mounted trailer hitch coupler lock assembly 100 prevents the rearward movement of the collar 24, thereby locking the cap 16. If the cap 16 is secured to the ball 12, as when a trailer is attached to a pulling vehicle, the presence of the trailer hitch coupler lock assembly 100 will prevent disengagement of the coupler 10 from the ball 12. If the cap 16 is not secured to the ball 12, as when a trailer is not attached to its pulling vehicle, the presence of the trailer hitch coupler lock assembly will prevent engagement with the ball 12, effectively insuring that the trailer can be used only by the owner.

The trailer hitch coupler assembly 100 can be modified to include an optional feature of a locking rod 172 as shown in FIG. 9 in which the trailer hitch coupler 100 is depicted in its open position. The locking rod 172 extends from the inwardly from the internal surface of the first bracket member 156. It will be understood that, to use the trailer hitch coupler assembly 100 modified to have the locking rod 172, the tongue 30 will need to be modified to have the retaining bore 74 as described above and shown in FIG. 4 to receive the insertion of the locking rod 172. The locking rod 172 and retaining bore 74 may be provided in those applications in which the prevention of rotation of the mounted trailer hitch coupler lock assembly on the tongue 30 is desired, such as when a trailer coupler does not have a handle such as represented by the handle 26.

It will be appreciated that each of the embodiments described herein of the present invention is well suited to secure a wide variety of trailer hitch couplers of the type described herein without modification of such couplers. Thus, it is clear that the present invention is well adapted to carry out the objects and to attain the ends and advantages mentioned as well as those inherent therein. While presently preferred embodiments of the invention have been described in varying detail for purposes of the disclosure, it will be understood that numerous changes may be made which will readily suggest themselves to those skilled in the art and which are encompassed within the spirit of the invention disclosed and as defined in the above text and in the accompanying drawings.

What is claimed is:

1. A trailer hitch coupler lock assembly for selectively locking a sliding collar in a coupler of a trailer hitch, comprising:
   a first bracket comprising a locking tab defining a first locking bore at a first end of the first bracket;
   a second bracket comprising a locking tab defining a second locking bore at a first end of the second bracket;
   a hinge interconnecting opposing second ends of the brackets permitting movement between an open position and a closed position, the brackets defining a cavity in the closed position that is closely matingly engageable with a cross sectional perimeter of a member upon which the collar is slidable, thereby preventing movement of the collar to the open position.

2. The trailer hitch coupler lock assembly of claim 1 wherein the coupler has a handle for moving the collar between the open and closed positions, and wherein the cavity defines a notch that is receivingly engageable with the handle in the closed position of the brackets.

3. The trailer hitch coupler lock assembly of claim 1 wherein the bores are aligned in the closed position of the brackets, the bores defined by recessed opposing surfaces of the tabs for adaptively concealing a locking member passing through the bores and fixing the brackets in the closed position of the brackets.

4. A trailer hitch coupler lock assembly for securing a sliding collar in a coupler of a trailer hitch wherein a hitch ball is secured to one of either a vehicle or trailer and the coupler is secured to the other of the vehicle or trailer, the coupler having a body and a cap pivotally supported by the body, the body and cap forming a cavity for receiving the hitch ball when the body and cap are closed thereon and releasing the hitch ball in an open position, and a collar mounted on the body having a releasing position to allow opening of the body and cap and a latching position wherein the collar moves the body and cap to the closed position, the trailer hitch coupler lock assembly comprising:

- a first bracket comprising a locking tab defining a first locking bore at a first end of the first bracket;
- a second bracket comprising a locking tab defining a second locking bore at a first end of the second bracket; and
- a hinge interconnecting opposing second ends of the brackets permitting movement between an open and a closed position, the brackets annularly defining a cavity in the closed position configured for an interference fit with a cross section of the collar preventing a sliding receiving engagement of the collar in the cavity.

5. The trailer hitch couple lock assembly of claim 4 wherein the coupler has a handle for moving the collar between the open and closed positions, and wherein the cavity defines a notch that is receivingly engageable with the handle in the closed position of the brackets.

6. The trailer hitch coupler lock assembly of claim 4 wherein the bores are aligned in the closed position of the brackets, the bores defined by recessed opposing surfaces of the tabs for adaptively concealing a locking member passing through the bores and fixing the brackets in the closed position of the brackets.

7. In a coupler for a hitch ball having a cap with a fixed portion and a hinged portion moveable between a closed position to couplingly engage the hitch ball and an open position to couplingly disengage the hitch ball, the coupler further having a tongue attached to the cap and a collar circumscribing and longitudinally slidable on the tongue and the cap between a locked position engaging the hinged portion for retaining the closed position and an unlocked position disengaging the hinged portion for permitting the open position, the collar extent of travel in the locked position defined by a wedging engagement of the collar against the hinged portion, the collar extent of travel in the unlocked position defined by a shoulder abutment portion of the tongue, an improved lock comprising a body with a cavity defined by an internal surface that is closely matingly engageable with a circumferential portion of the tongue adjacent the shoulder to abuttingly engage against the collar on one side of the lock and abuttingly engage against the shoulder on the opposing side of the lock, preventing collar movement to the unlocked position.

* * * * *